(12) United States Patent
Kim et al.

(10) Patent No.: US 12,181,744 B2
(45) Date of Patent: Dec. 31, 2024

(54) DISPLAY APPARATUS AND LIGHT SOURCE DEVICE THEREOF

(71) Applicant: SAMSUNG ELECTRONICS CO., LTD., Suwon-si (KR)

(72) Inventors: Sungyeol Kim, Suwon-si (KR); Chunsoon Park, Suwon-si (KR); Kyehoon Lee, Suwon-si (KR); Youngmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 543 days.

(21) Appl. No.: 17/311,118

(22) PCT Filed: Mar. 8, 2021

(86) PCT No.: PCT/KR2021/002837
§ 371 (c)(1),
(2) Date: Jun. 4, 2021

(87) PCT Pub. No.: WO2022/124481
PCT Pub. Date: Jun. 16, 2022

(65) Prior Publication Data
US 2023/0350246 A1 Nov. 2, 2023

(30) Foreign Application Priority Data
Dec. 9, 2020 (KR) .................. 10-2020-0171209

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133605* (2013.01)

(58) Field of Classification Search
CPC ................................................ G02F 1/133607
See application file for complete search history.

(56) References Cited

U.S. PATENT DOCUMENTS

| 8,235,571 B2 | 8/2012 | Park |
| 8,284,350 B2 | 10/2012 | Abe et al. |

(Continued)

FOREIGN PATENT DOCUMENTS

| JP | 2008-287892 A | 11/2008 |
| JP | 4983347 B2 | 7/2012 |

(Continued)

OTHER PUBLICATIONS

International Search Report (PCT/ISA/210) issued Aug. 30, 2021, by the International Searching Authority in International Application No. PCT/KR2021/002837.

(Continued)

*Primary Examiner* — Edmond C Lau
(74) *Attorney, Agent, or Firm* — Sughrue Mion, PLLC

(57) ABSTRACT

A display apparatus includes a reflective sheet through which a through hole is disposed, and a light source module exposed through the through hole. The light source module includes a substrate on which the reflective sheet is disposed, and a light emitting diode disposed on a portion of the substrate, the portion corresponding to the through hole. The light source module further includes an optical dome covering the light emitting diode, and a first light pattern disposed on the substrate and inside the optical dome, the first light pattern including a material having a reflectivity higher than a reflectivity of the substrate.

18 Claims, 12 Drawing Sheets

(56) References Cited

U.S. PATENT DOCUMENTS

| | | | |
|---|---|---|---|
| 9,310,645 | B2 | 4/2016 | Lee |
| 9,857,631 | B2 | 1/2018 | Park et al. |
| 10,139,077 | B2 | 11/2018 | Kang et al. |
| 2007/0194336 | A1* | 8/2007 | Shin ..................... H01L 33/483 |
| | | | 438/27 |
| 2011/0096265 | A1 | 4/2011 | Murakoshi et al. |
| 2012/0243261 | A1* | 9/2012 | Yamamoto ........ G02F 1/133603 |
| | | | 362/613 |
| 2015/0219966 | A1* | 8/2015 | Song ..................... F21V 5/046 |
| | | | 362/97.3 |
| 2018/0180943 | A1* | 6/2018 | Sawanaka ......... G02F 1/133603 |

FOREIGN PATENT DOCUMENTS

| | | |
|---|---|---|
| JP | 2012-204370 A | 10/2012 |
| KR | 10-2015-0046650 A | 4/2015 |
| KR | 10-2015-0077153 A | 7/2015 |
| KR | 10-2015-0092808 A | 8/2015 |
| KR | 10-2016-0116947 A | 10/2016 |
| KR | 10-2016-0138680 A | 12/2016 |
| KR | 10-2017-0008046 A | 1/2017 |

OTHER PUBLICATIONS

Communication issued Aug. 19, 2024 by the Korean Intellectual Property Office in Korean Patent Application No. 10-2020-0171209.

* cited by examiner

DISPLAY APPARATUS AND LIGHT SOURCE DEVICE THEREOF

CROSS-REFERENCE TO RELATED APPLICATIONS

This application is a U.S. national stage application under 35 U.S.C. § 371 of International Application No. PCT/KR2021/002837, filed on Mar. 8, 2021, which is based on and claims priority under 35 U.S.C. § 119 to Korean Patent Application No. 10-2020-0171209, filed on Dec. 9, 2020, in the Korean Intellectual Property Office, the disclosures of which are incorporated by reference herein in their entireties.

BACKGROUND

1. Field

The disclosure relates to a display apparatus and a light source device thereof, and more particularly, to a display apparatus including an improved optical structure and a light source device thereof.

2. Description of Related Art

A display apparatus is a kind of an output apparatus that converts obtained or stored electrical information into visual information and displays the visual information to a user. The display apparatus may be used in various fields, such as home or workplace.

The display apparatus includes a monitor apparatus connected to a personal computer or a server computer, a portable computer device, a navigation terminal device, a television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus includes a light source module to convert electrical information into visual information, and the light source module includes a plurality of light sources configured to independently emit light.

Each of the plurality of light sources includes a light emitting diode (LED) or an organic light emitting diode (OLED). For example, the LED or the OLED may be mounted on a circuit board or a substrate.

SUMMARY

Provided is a display apparatus capable of improving uniformity of light.

Further, provided is a display apparatus capable of improving efficiency of light.

Additional aspects will be set forth in part in the description that follows and, in part, will be apparent from the description, or may be learned by practice of presented embodiments.

In accordance with an aspect of the disclosure, a light source device includes a reflective sheet through which a through hole is disposed, and a light source module exposed through the through hole. The light source module includes a substrate on which the reflective sheet is disposed, and a light emitting diode disposed on a portion of the substrate, the portion corresponding to the through hole. The light source module further includes an optical dome covering the light emitting diode, and a first light pattern disposed on the substrate and inside the optical dome, the first light pattern including a material having a reflectivity higher than a reflectivity of the substrate.

The first light pattern may include silk.

The light source module may include a second light pattern disposed on another portion of the substrate and outside the optical dome, the other portion of the substrate being exposed through the through hole.

The second light pattern may include copper.

The second light pattern may include a plurality of light patterns having a same shape.

The light source module may include a second light pattern disposed on the substrate and inside the optical dome, the second light pattern including a material different from the material of the first light pattern.

The optical dome may include silicon.

The light emitting diode may be configured to emit blue light.

In accordance with an aspect of the disclosure, a display apparatus includes a light source device configured to output surface light, and a liquid crystal panel configured to block and transmit the output surface light. The light source device includes a reflective sheet through which a through hole is formed, and a light source module exposed through the through hole. The light source module includes a substrate on which the reflective sheet is disposed, and a light emitting diode disposed on a first portion of the substrate, the first portion corresponding to the through hole. The light source module further includes an optical dome covering the light emitting diode and including silicon, and a first light pattern disposed on a second portion of the substrate, the second portion being exposed through the through hole. The light source module further includes a second light pattern provided on a third portion of the substrate, the third portion being exposed through the through hole, and the second light pattern including a material different from a material of the first light pattern.

The first light pattern may be disposed inside the optical dome, and the second light pattern may be disposed outside the optical dome.

The first light pattern and the second light pattern may be disposed inside the optical dome.

The first light pattern may be disposed outside the optical dome, and the second light pattern may be disposed inside the optical dome.

The first light pattern and the second light pattern may be disposed outside the optical dome.

The first light pattern may be configured to absorb blue light that is emitted from the light emitting diode, and convert the absorbed blue light to a different color light, and the second light pattern may be configured to absorb the emitted blue light.

The first light pattern may be configured to absorb blue light that is emitted from the light emitting diode, and the second light pattern may be configured to absorb the emitted blue light.

In accordance with an aspect of the disclosure, a light source device includes a substrate, and a reflective sheet disposed on the substrate and through which a through hole is disposed. The light source device further includes a light emitting diode disposed on a first portion of the substrate, the first portion corresponding to the through hole, and an optical dome covering the light emitting diode. The light source device further includes a first light pattern disposed on a second portion of the substrate and inside the optical dome, the second portion corresponding to the through hole, and the first light pattern including a material having a reflectivity higher than a reflectivity of the substrate, and a second light pattern disposed on a third portion of the substrate and outside the optical dome, the third portion corresponding to the through hole.

The second light pattern may have a shape different from a shape of the first light pattern.

The second light pattern may include a plurality of light patterns, a first one among the plurality of light patterns having a shape different from a shape of the first light pattern, and a second one among the plurality of light patterns having a shape same as the shape of the first light pattern.

The second light pattern may include a material different from the material of the first light pattern.

The second light pattern may include a number of light patterns that is different from a number of light patterns of the first light pattern.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
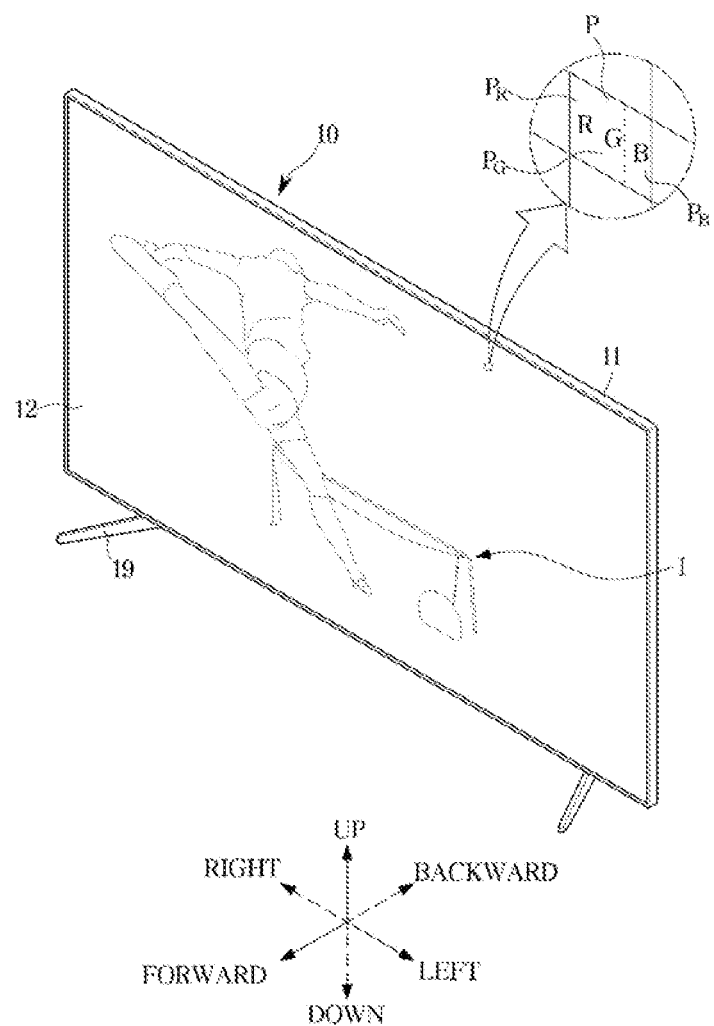
FIG. 1 is a view of an appearance of a display apparatus according to an embodiment.

A display apparatus may improve uniformity of light because a light pattern is provided inside and/or outside an optical dome provided to cover a light emitting diode.

In the following description, like reference numerals refer to like elements throughout the specification. Well-known functions or constructions may not be described in detail because they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is may not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Hereinafter embodiments will be described in detail with reference to the accompanying drawings.

FIG. 1 is a view of an appearance of a display apparatus according to an embodiment.

A display apparatus 10 is a device that processes an image signal received from the outside and visually displays the processed image. Hereinafter a case in which the display apparatus 10 is a television is exemplified, but the disclosure is not limited thereto. For example, the display apparatus 10 may be implemented in various forms, such as a monitor, a portable multimedia device, and a portable communication device, and the display apparatus 10 is not limited in its shape as long as visually displaying an image.

The display apparatus 10 may be a large format display (LFD) installed outdoors, such as a roof of a building or a bus stop. The outdoor is not limited to the outside of a building, and thus the display apparatus 10 according to one embodiment may be installed in any places as long as the display apparatus is accessed by a large number of people, even indoors, such as subway stations, shopping malls, movie theaters, companies, and stores.

The display apparatus 10 may receive content data including vide data and audio data from various content sources and output video and audio corresponding to the video data and the audio data. For example, the display apparatus 10 may receive content data through a broadcast reception antenna or cable, receive content data from a content playback device, or receive content data from a content providing server of a content provider.

As illustrated in FIG. 1, the display apparatus 10 includes a body 11, a screen 12 configured to display an image I, and a supporter 19 provided below the body 11 and provided to support the body 11.

The body 11 may form an appearance of the display apparatus 10, and the body 11 may include a component configured to allow the display apparatus 10 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and display the image I. For example, the screen 12 may display a still image or a moving image. Further, the screen 12 may display a two-dimensional plane image or a three-dimensional image using binocular parallax of the user.

A plurality of pixels P may be formed on the screen 12 and the image I displayed on the screen 12 may be formed by a combination of the lights emitted from the plurality of pixels P. For example, a single still image may be formed on the screen 12 by combining light emitted from the plurality of pixels P as a mosaic.

Each of the plurality of pixels P may emit different brightness and different color of light. To emit different brightness of light, each of the plurality of pixels P may include a self-emission panel (for example, a light emitting diode panel) configured to directly emit light or a non-self-emission panel (for example, a liquid crystal panel) configured to transmit or block light emitted by a light source device.

To emit light in the various colors, the plurality of pixels P may include sub-pixels PR, PG, and PB, respectively.

The sub-pixels PR, PG, and PB may include a red sub pixel PR emitting red light, a green sub pixel PG emitting green light, and a blue sub pixel PB emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel PR, the green light of the green sub pixel PG and the blue light of the blue sub pixel PB, each of the plurality of pixels P may emit different brightness and different color of light.

Figure 2:
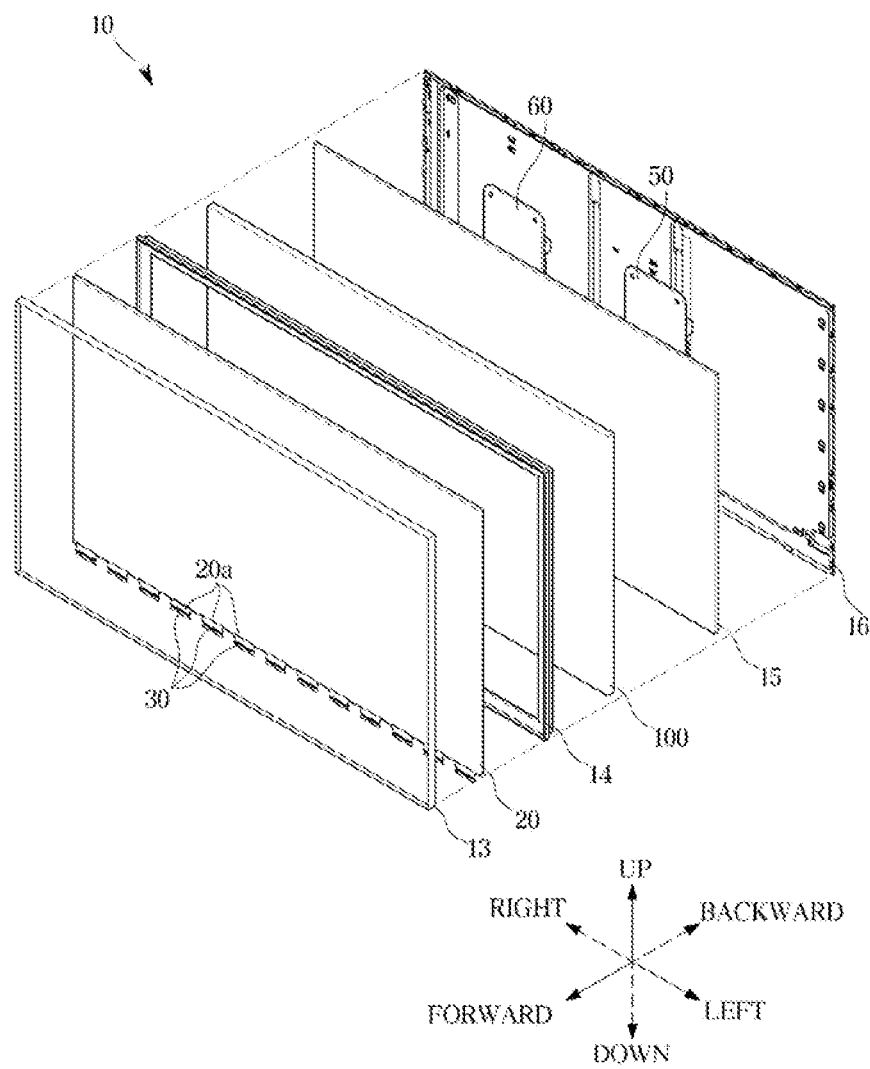
FIG. 2 is an exploded view of the display apparatus illustrated in FIG. 1.

FIG. 2 is an exploded view of the display apparatus illustrated in FIG. 1.

As shown in FIG. 2, various components configured to generate the image I on the screen S may be provided inside the body 11.

For example, in the body 11, a light source device 100 that is a surface light source, a liquid crystal panel 20 configured to block or transmit light emitted from the light source device 100, a control assembly 50 configured to control an operation of the light source device 100 and the liquid crystal panel 20, and a power assembly 60 configured to supply power to the light source device 100 and the liquid crystal panel 20 are provided. Further, the body 11 includes a bezel 13, a frame middle mold 14, a bottom chassis 15 and a rear cover 16 that are configured to support and fix the liquid crystal panel 20, the light source device 100, the control assembly 50 and the power assembly 60.

The light source device 100 may include a point light source configured to emit monochromatic light or white light. The light source device 100 may refract, reflect, and scatter light in order to convert light, which is emitted from the point light source, into uniform surface light. For example, the light source device 100 may include a plurality of light sources configured to emit monochromatic light or white light, a diffuser plate configured to diffuse light incident from the plurality of light sources, a reflective sheet configured to reflect light emitted from the plurality of light sources and a rear surface of the diffuser plate, and an optical sheet configured to refract and scatter light emitted from the front surface of the diffuser plate.

As mentioned above, the light source device 100 may refract, reflect, and scatter light emitted from the light source, thereby emitting uniform surface light toward the front.

A configuration of the light source device 100 will be described in more detail below.

Figure 3:
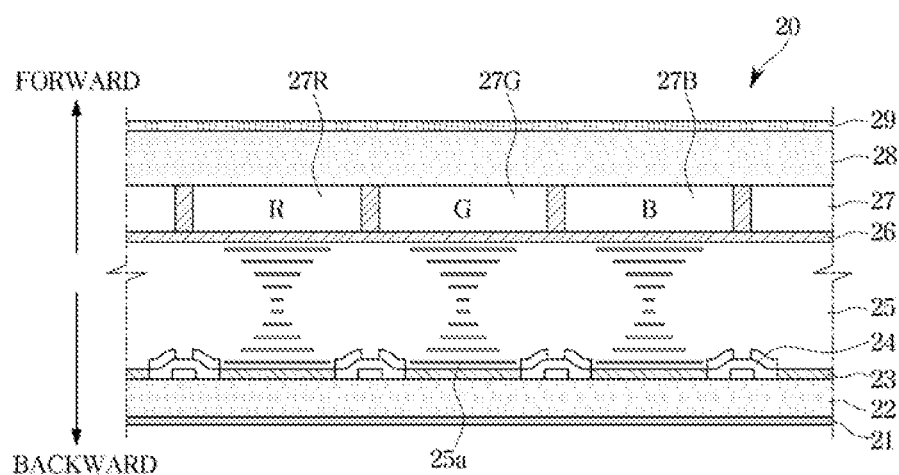
FIG. 3 is a cross-sectional view of a liquid crystal panel of the display apparatus shown in FIG. 2.

FIG. 3 is a cross-sectional view of a liquid crystal panel of the display apparatus shown in FIG. 2.

The liquid crystal panel 20 is provided in front of the light source device 100 and blocks or transmits light emitted from the light source device 100 to form the image I.

A front surface of the liquid crystal panel 20 may form the screen 12 of the display apparatus 10 described above, and the liquid crystal panel 20 may form the plurality of pixels P. In the liquid crystal panel 20, the plurality of pixels P may independently block or transmit light from the light source device 100, and the light transmitted through the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on the outside of the first and second transparent substrates 22 and 28.

Each of the first polarizing film 21 and the second polarizing film 29 may transmit a light beam and block other light beams. For example, the first polarizing film 21 transmits a light beam having a magnetic field vibrating in a first direction and blocks other light beams. In addition, the second polarizing film 29 transmits a light beam having a magnetic field vibrating in a second direction and blocks other light beams. In this case, the first direction and the second direction may be perpendicular to each other. Accordingly, a polarization direction of the light transmitted through the first polarizing film 21 and a vibration direction of the light transmitted through the second polarizing film 29 are perpendicular to each other. As a result, light may not pass through the first polarizing film 21 and the second polarizing film 29 at the same time.

The color filter 27 may be provided inside the second transparent substrate 28.

The color filter 27 may include a red filter 27R transmitting red light, a green filter 27G transmitting green light, and a blue filter 27B transmitting blue light. The red filter 27R, the green filter 27G, and the blue filter 27B may be disposed parallel to each other. A region in which the color filter 27 is formed corresponds to the pixel P described above. A region in which the red filter 27R is formed corresponds to the red sub-pixel PR, a region in which the green filter 27G is formed corresponds to the green sub-pixel PG, and a region in which the blue filter 27B is formed corresponds to the blue sub-pixel PB.

The pixel electrode 23 may be provided inside the first transparent substrate 22, and the common electrode 26 may be provided inside the second transparent substrate 28.

The pixel electrode 23 and the common electrode 26 may be formed of a metal material through which electricity is conducted. The pixel electrode 23 and the common electrode 26 may generate an electric field to change the arrangement of liquid crystal molecules 25a forming the liquid crystal layer 25 to be described below.

The pixel electrode 23 and the common electrode 26 may be formed of a transparent material, and may transmit light incident from the outside. For example, the pixel electrode 23 and the common electrode 26 may include indium tin oxide (ITO), indium zinc oxide (IZO), silver nanowire (Ag nano wire), carbon nanotube (CNT), graphene, or poly (3,4-ethylenedioxythiophene: PEDOT).

The thin film transistor (TFT) 24 is provided inside the second transparent substrate 22.

The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The TFT 24 may be formed of poly-silicon, and may be formed by semiconductor processes, such as lithography, deposition, and ion implantation.

The liquid crystal layer 25 is formed between the pixel electrode 23 and the common electrode 26, and the liquid crystal layer 25 is filled with the liquid crystal molecules 25a.

Liquid crystals represent an intermediate state between a solid (crystal) and a liquid. Most of the liquid crystal materials are organic compounds, and the molecular shape is in the shape of an elongated rod, and the arrangement of molecules is in an irregular state in one direction, but may have a regular crystal shape in other directions. As a result, the liquid crystal has both the fluidity of the liquid and the optical anisotropy of the crystal (solid).

In addition, liquid crystals also exhibit optical properties according to changes in an electric field. For example, in the liquid crystal, the direction of the arrangement of molecules forming the liquid crystal may change according to a change in an electric field. In response to an electric field being generated in the liquid crystal layer 25, the liquid crystal molecules 25a of the liquid crystal layer 25 may be arranged according to the direction of the electric field. In response to the electric field not being generated in the liquid crystal layer 25, the liquid crystal molecules 25a may be arranged irregularly or arranged along an alignment layer. As a result, the optical properties of the liquid crystal layer 25 may vary depending on the presence or absence of the electric field passing through the liquid crystal layer 25.

A cable 20a configured to transmit image data to the liquid crystal panel 20, and a display driver integrated circuit (DDI) (hereinafter referred to as 'driver IC') 30 configured to process digital image data and output an analog image signal are provided at one side of the liquid crystal panel 20.

The cable 20a may electrically connect the control assembly 50/the power assembly 60 to the driver IC 30, and may also electrically connect the driver IC 30 to the liquid crystal panel 20. The cable 20a may include a flexible flat cable or a film cable that is bendable.

The driver IC 30 may receive image data and power from the control assembly 50/the power assembly 60 through the cable 20a. The driver IC 30 may transmit the image data and driving current to the liquid crystal panel 20 through the cable 20a.

In addition, the cable 20a and the driver IC 30 may be integrally implemented as a film cable, a chip on film (COF), or a tape carrier package (TCP). In other words, the driver IC 30 may be disposed on the cable 20b. However, the disclosure is not limited thereto, and the driver IC 30 may be disposed on the liquid crystal panel 20.

The control assembly 50 may include a control circuit configured to control an operation of the liquid crystal panel 20 and the light source device 100. The control circuit may process image data received from an external content source, transmit the image data to the liquid crystal panel 20, and transmit dimming data to the light source device 100.

The power assembly 60 may supply power to the liquid crystal panel 20 and the light source device 100 to allow the light source device 100 to output surface light and to allow the liquid crystal panel 20 to block or transmit the light of the light source device 100.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Hereinafter the light source device 100 will be described.

Figure 4:
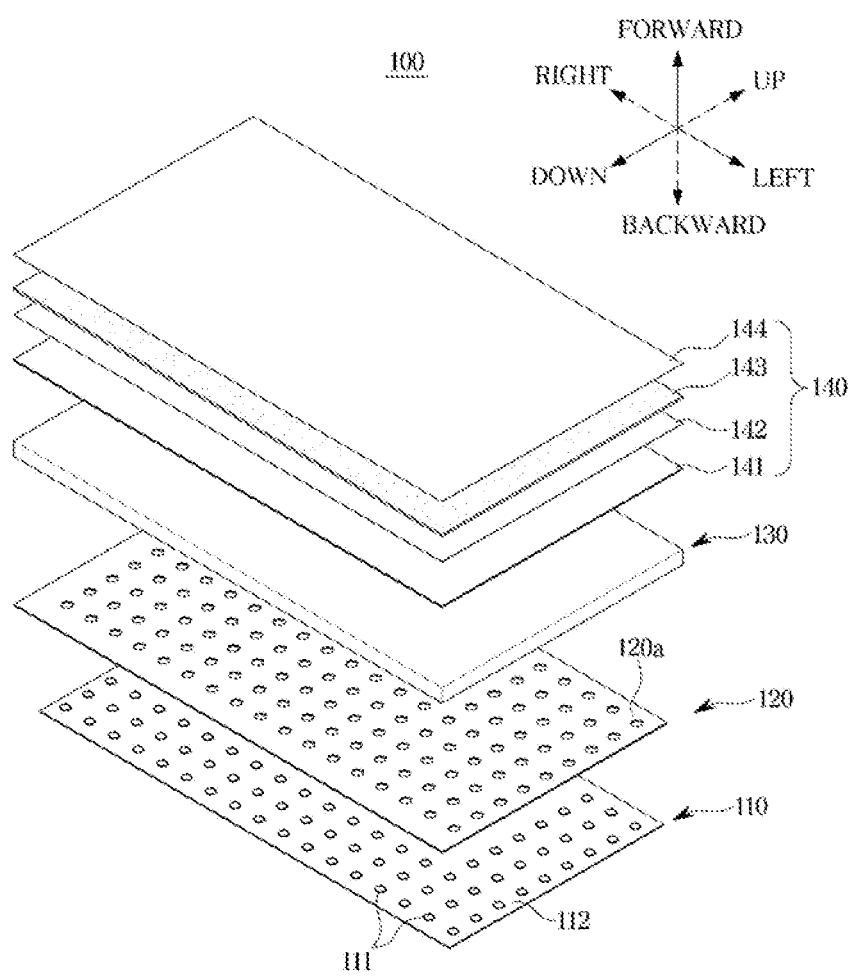
FIG. 4 is an exploded view of a light source device shown in FIG. 2.
Figure 5:
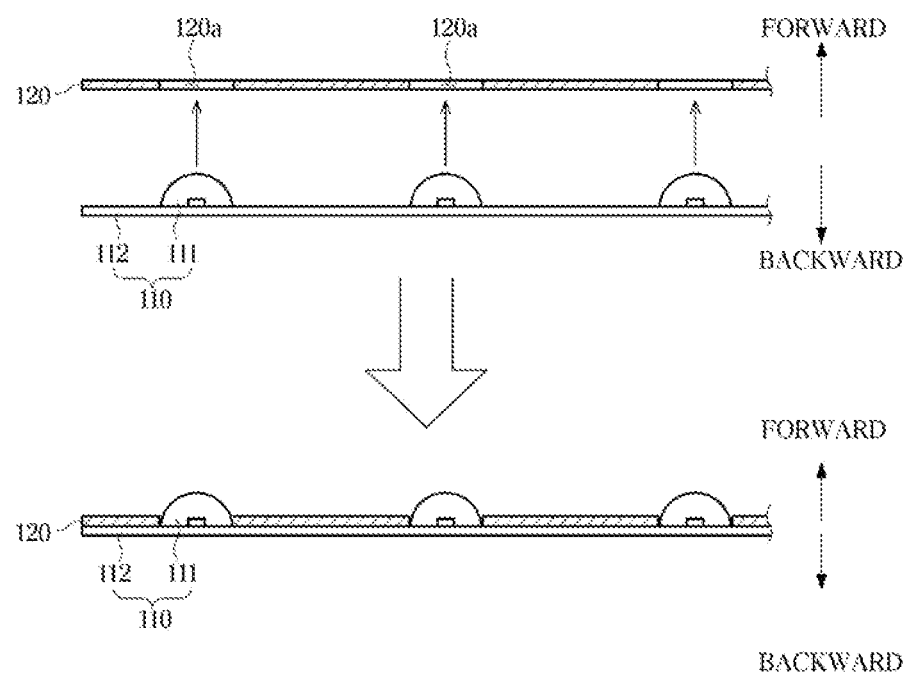
FIG. 5 is a cross-sectional view illustrating a coupling between a light source module and a reflective sheet included in the light source device shown in FIG. 4.

FIG. 4 is an exploded view of a light source device shown in FIG. 2. FIG. 5 is a cross-sectional view illustrating a coupling between a light source module and a reflective sheet included in the light source device shown in FIG. 4.

The light source device 100 includes a light source module 110 configured to generate light, a reflective sheet 120 configured to reflect light, a diffuser plate 130 configured to uniformly diffuse light, and an optical sheet 140 configured to improve luminance of light that is emitted.

The light source module 110 may include a plurality of light sources 111 configured to emit light, and a substrate 112 configured to support/fix the plurality of light sources 111.

The plurality of light sources 111 may be arranged in a predetermined pattern to allow light to be emitted with uniform luminance. The plurality of light sources 111 may be arranged in such a way that a distance between one light source and light sources adjacent thereto is the same.

For example, as shown in FIG. 4, the plurality of light sources 111 may be arranged in rows and columns. Accordingly, the plurality of light sources may be arranged such that an approximately square is formed by four adjacent light sources. In addition, any one light source may be disposed adjacent to four light sources, and a distance between one light source and four adjacent light sources may be approximately the same.

Alternatively, the plurality of light sources may be disposed in a plurality of rows, and a light source belonging to each row may be disposed at the center of two light sources belonging to an adjacent row. Accordingly, the plurality of light sources may be arranged such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the pattern described above, and the plurality of light sources 111 may be disposed in various patterns to allow light to be emitted with uniform luminance.

The light source 111 may employ an element configured to emit monochromatic light (light of a wavelength, for example, blue light) or white light (for example, light of a mixture of red light, green light, and blue light) in various directions by receiving power. For example, the light source 111 may include a light emitting diode (LED).

The substrate 112 may fix the plurality of light sources 111 to prevent a change in the position of the light source 111. Further, the substrate 112 may supply power, which is for the light source 111 to emit light, to the light source 111.

The substrate 112 may fix the plurality of light sources 111 and may be configured with synthetic resin or tempered glass or a printed circuit board (PCB) on which a conductive power supply line for supplying power to the light source 111 is formed.

The reflective sheet 120 may reflect light emitted from the plurality of light sources 111 forward or in a direction close to the front.

In the reflective sheet 120, a plurality of through holes 120a is formed at positions corresponding to each of the plurality of light sources 111 of the light source module 110. In addition, the light source 111 of the light source module 110 may pass through the through hole 120a and protrude to the front of the reflective sheet 120.

For example, as shown in the upper portion of FIG. 5, in the process of assembling the reflective sheet 120 and the light source module 110, the plurality of light sources 111 of the light source module 110 is inserted into the through holes 120a formed on the reflective sheet 120. Accordingly, as shown in the lower portion of FIG. 5, the substrate 112 of the light source module 110 may be located behind the reflective sheet 120, but the plurality of light sources 111 of the light source module 110 may be located in front of the reflective sheet 120.

Accordingly, the plurality of light sources 111 may emit light in front of the reflective sheet 120.

The plurality of light sources 111 may emit light in various directions from the front of the reflective sheet 120. The light may not only be emitted toward the diffuser plate 130 from the light source 111, but also may be emitted toward the reflective sheet 120 from the light source 111. The reflective sheet 120 may reflect light, which is emitted toward the reflective sheet 120, toward the diffuser plate 130.

Light emitted from the light source 111 passes through various objects, such as the diffuser plate 130 and the optical sheet 140. Among incident light beams passing through the diffuser plate 130 and the optical sheet 140, some of the incident light beams are reflected from the surfaces of the diffuser plate 130 and the optical sheet 140. The reflective sheet 120 may reflect light reflected by the diffuser plate 130 and the optical sheet 140.

The diffuser plate 130 may be provided in front of the light source module 110 and the reflective sheet 120, and may evenly distribute the light emitted from the light source 111 of the light source module 110.

As described above, the plurality of light sources 111 is located in various places on the rear surface of the light source device 100. Although the plurality of light sources 111 is disposed at equal intervals on the rear surface of the light source device 100, unevenness in luminance may occur depending on the positions of the plurality of light sources 111.

The diffuser plate 130 may diffuse light emitted from the plurality of light sources 111 within the diffuser plate 130 in order to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and uniformity of luminance. For example, the optical sheet 140 may include a diffusion sheet 141, a first prism sheet 142, a second prism sheet 143, and a reflective polarizing sheet 144.

The diffusion sheet 141 diffuses light for uniformity of luminance. The light emitted from the light source 111 may be diffused by the diffuser plate 130 and may be diffused again by the diffusion sheet 141 included in the optical sheet 140.

The first and second prism sheets 142 and 143 may increase luminance by condensing light diffused by the diffusion sheet 141. The first and second prism sheets 142 and 143 include a prism pattern in the shape of a triangular prism, and a plurality of prism patterns is arranged adjacent to each other to form a plurality of strips.

The reflective polarizing sheet 144 is a type of polarizing film and may transmit a portion of the incident light and reflect another portion thereof for improving the luminance. For example, the reflective polarizing sheet 144 may transmit polarized light in the same direction as a predetermined polarization direction of the reflective polarizing sheet 144, and may reflect polarized light in a direction different from the polarization direction of the reflective polarizing sheet 144. In addition, the light reflected by the reflective polarizing sheet 144 is recycled inside the light source device 100, and thus the luminance of the display apparatus 10 may be improved by the light recycling.

The optical sheet 140 is not limited to the sheet or film shown in FIG. 4, and may include more various sheets or films, such as a protective sheet.

Figure 6:
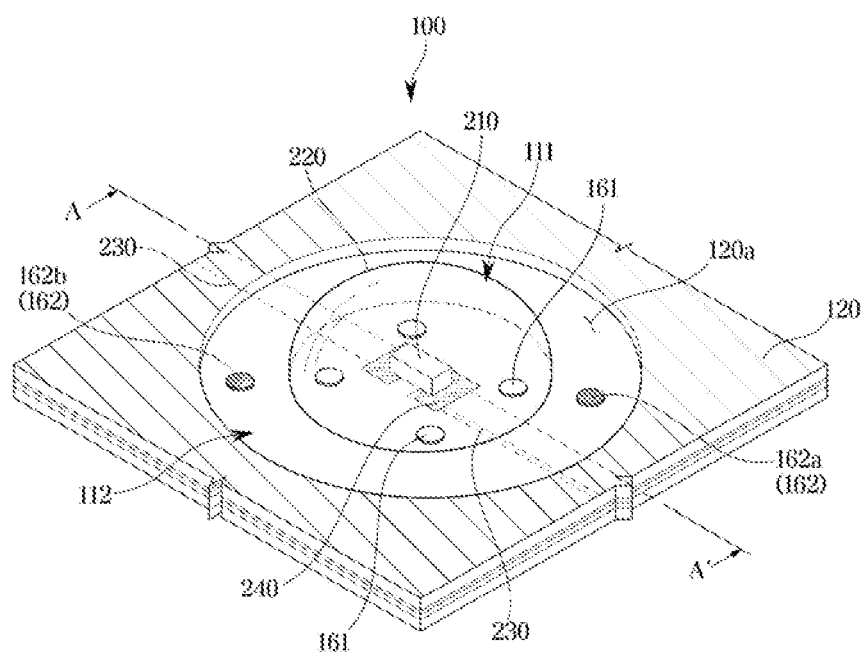
FIG. 6 is a perspective view of a light source included in the light source device shown in FIG. 4.
Figure 7:
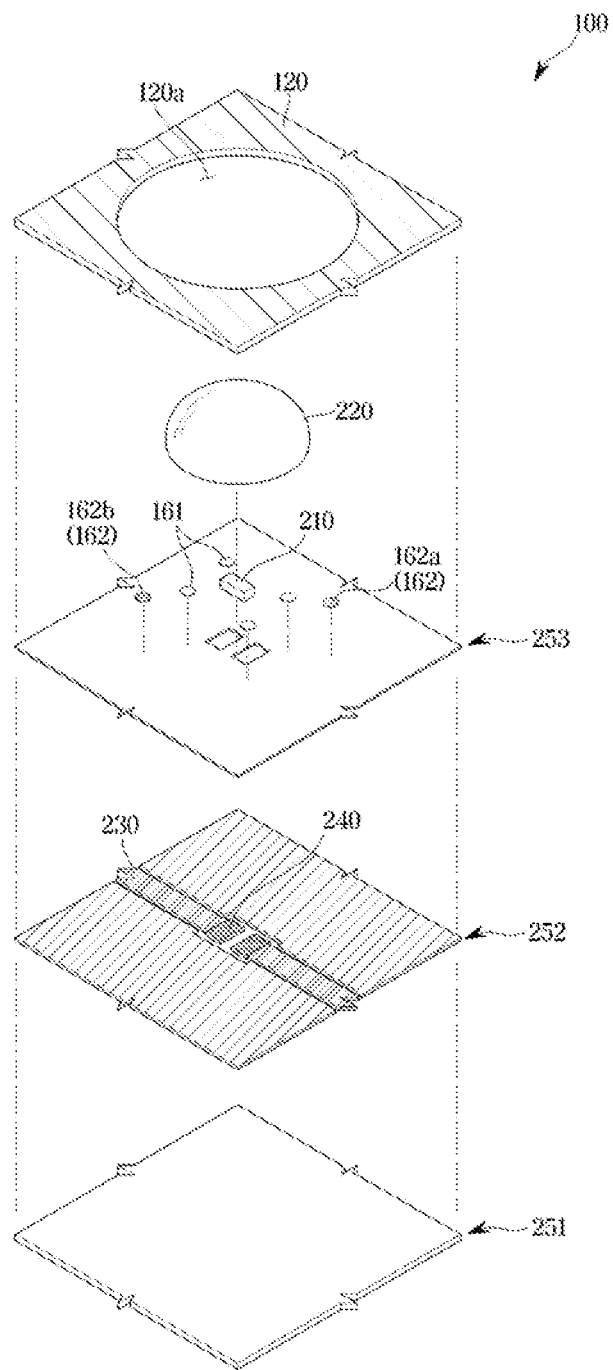
FIG. 7 is an exploded view of the light source shown in FIG. 6.
Figure 8:
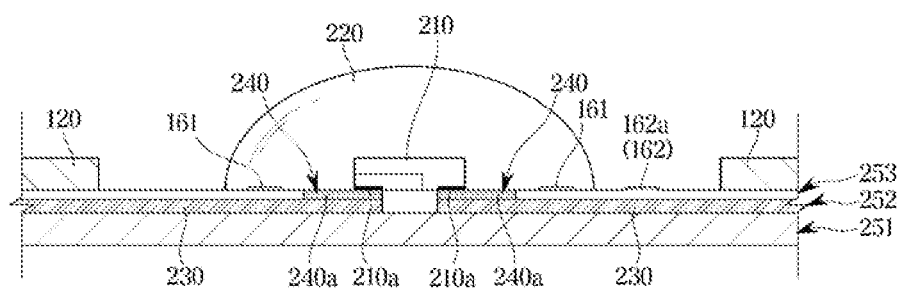
FIG. 8 is a cross-sectional view taken along line A-A' shown in FIG. 6.
Figure 9:
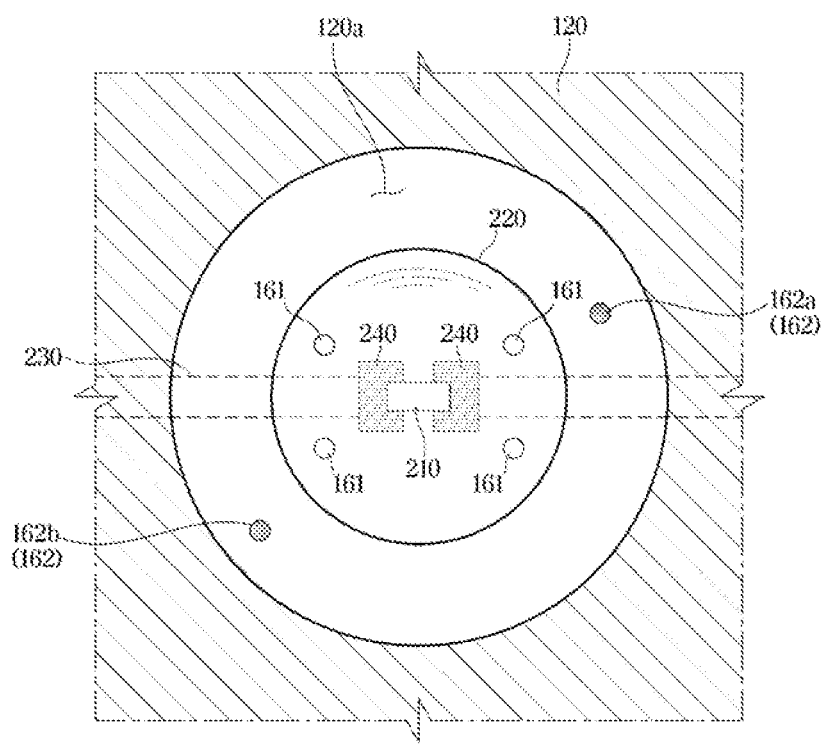
FIG. 9 is a top plan view of the light source shown in FIG. 6.
Figure 10:
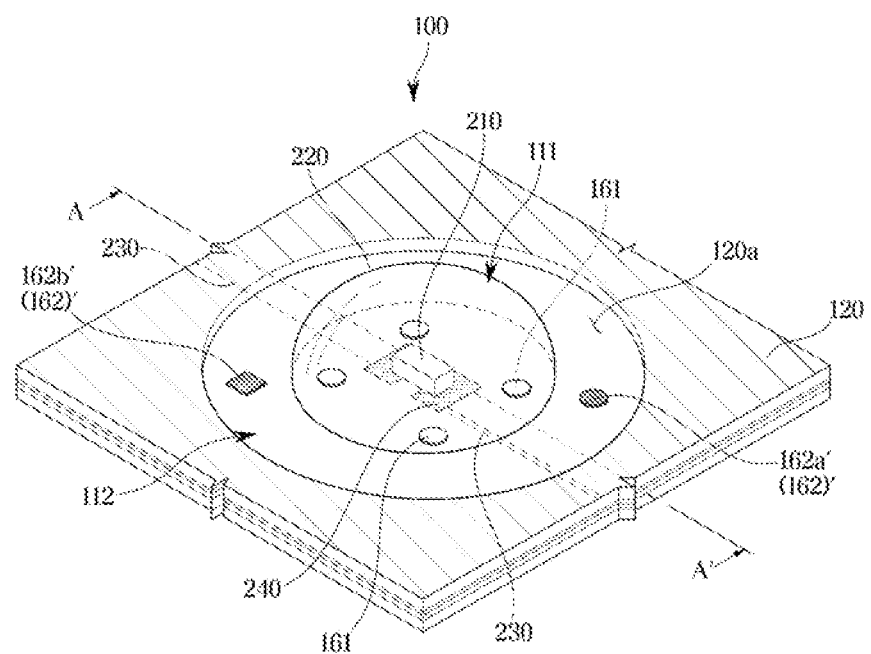
FIG. 10 is a perspective view of a light source included in a light source device according to another embodiment of the disclosure.

FIG. 6 is a perspective view of a light source included in the light source device shown in FIG. 4. FIG. 7 is an exploded view of the light source shown in FIG. 6. FIG. 8 is a cross-sectional view taken along line A-A' shown in FIG. 6. FIG. 9 is a top plan view of the light source shown in FIG. 6. FIG. 10 is a perspective view of a light source included in a light source device according to another embodiment of the disclosure.

The light source 111 of the light source device 100 will be described with reference to FIGS. 6 to 10.

As described above, the light source module 110 includes the plurality of light sources 111. The plurality of light sources 111 may protrude forward of the reflective sheet 120 from the rear of the reflective sheet 120 by passing through the through hole 120a. Accordingly, as shown in FIGS. 6 and 7, the light source 111 and a portion of the substrate 112 may be exposed toward the front of the reflective sheet 120 through the through hole 120a.

The light source 111 may include an electrical/mechanical structure positioned in a region defined by the through hole 120a of the reflective sheet 120.

Each of the plurality of light sources 111 may include a light emitting diode 210, and an optical dome 220.

The light emitting diode 210 may include a P-type semiconductor and an N-type semiconductor for emitting light by recombination of holes and electrons. In addition, the light emitting diode 210 is provided with a pair of electrodes 210a for supplying hole and electrons to the P-type semiconductor and the N-type semiconductor, respectively.

The light emitting diode 210 may convert electrical energy into optical energy. In other words, the light emitting diode 210 may emit light having a maximum intensity at a predetermined wavelength to which power is supplied. For example, the light emitting diode 210 may emit blue light having a peak value at a wavelength indicating blue (for example, a wavelength between 430 nm and 495 nm).

The light emitting diode 210 may be directly attached to the substrate 112 in a Chip On Board (COB) method. In other words, the light source 111 may include the light emitting diode 210 to which a light emitting diode chip or a light emitting diode die is directly attached to the substrate 112 without an additional packaging.

In order to reduce the size of the light source 111, the light source module 110, in which the flip-chip type light emitting diode 210 is attached to the substrate 112 in a chip-on-board method, may be manufactured.

On the substrate 112, a power supply line 230 and a power supply pad 240 for supplying power to the flip-chip type light emitting diode 210 is provided.

On the substrate 112, the power supply line 230 for supplying electrical signals and/or power to the light emitting diode 210 from the control assembly 50 and/or the power assembly 60 is provided.

As shown in FIG. 8, the substrate 112 may be formed by alternately stacking an insulation layer 251 that is non-conductive and a conduction layer 252 that is conductive.

A line or pattern, through which power and/or electrical signals pass, is formed on the conduction layer 252. The conduction layer 252 may be formed of various materials having electrical conductivity. For example, the conduction layer 252 may be formed of various metal materials, such as copper (Cu), tin (Sn), aluminum (Al), or an alloy thereof.

A dielectric of the insulation layer 251 may insulate between lines or patterns of the conduction layer 252. The insulation layer 251 may be formed of a dielectric for electrical insulation, for example, FR-4.

The power supply line 230 may be implemented by a line or pattern formed on the conduction layer 252.

The power supply line 230 may be electrically connected to the light emitting diode 210 through the power supply pad 240.

The power supply pad 240 may be formed in such a way that the power supply line 230 is exposed to the outside.

A protection layer 253 configured to prevent or suppress damages caused by an external impact and/or damages caused by a chemical action (for example, corrosion, etc.) and/or damages caused by an optical action may be formed in the outermost part of the substrate 112. The protection layer 253 may include a photo solder resist (PSR).

As shown in FIG. 8, the protection layer 253 may cover the power supply line 230 to prevent the power supply line 230 from being exposed to the outside.

For electrical contact between the power supply line 230 and the light emitting diode 210, a window may be formed in the protection layer 253 to expose a part of the power supply line 230 to the outside. A part of the power supply line 230 exposed to the outside through the window of the protection layer 253 may form the power supply pad 240.

A conductive adhesive material 240a for the electrical contact between the power supply line 230 exposed to the outside and the electrode 210a of the light emitting diode 210 is applied to the power supply pad 240. The conductive adhesive material 240a may be applied within the window of the protection layer 253.

The electrode 210a of the light emitting diode 210 is in contact with the conductive adhesive material 240a, and the light emitting diode 210 may be electrically connected to the power supply line 230 through the conductive adhesive material 240a.

The conductive adhesive material 240a may include a solder having electrical conductivity. However, the disclosure is not limited thereto, and the conductive adhesive material 240a may include electrically conductive epoxy adhesives.

Power may be supplied to the light emitting diode 210 through the power supply line 230 and the power supply pad 240, and in response to the supply of the power, the light emitting diode 210 may emit light. A pair of power supply pads 240 corresponding to each of the pair of electrodes 210a provided in the flip chip type light emitting diode 210 may be provided.

The optical dome 220 may cover the light emitting diode 210. The optical dome 220 may prevent or suppress damages to the light emitting diode 210 caused by an external mechanical action and/or damage to the light emitting diode 210 caused by to a chemical action.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be a bow shape or a semicircle shape.

The optical dome 220 may be formed of silicone or epoxy resin. For example, the molten silicon or epoxy resin may be discharged onto the light emitting diode 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, when the optical dome 220 is manufactured using silicon having a thixotropic index of about 2.7 to 3.3 (appropriately, 3.0), the optical dome 220, in which a dome ratio (a height of the dome/a diameter of a base), which indicates a ratio of a height of a dome with respect to a diameter of a base of the dome, is approximately 0.25 to 0.31 (appropriately 0.28), may be formed. For example, the optical dome 220 formed of silicon having a thixotropic index of approximately 2.7 to 3.3 (appropriately, 3.0) may have a diameter of approximately 2.5 mm and a height of approximately 0.7 mm.

The optical dome 220 may be optically transparent or translucent. Light emitted from the light emitting diode 210 may be emitted to the outside by passing through the optical dome 220.

In this case, the optical dome 220 may refract light like a lens. For example, light emitted from the light emitting diode 210 may be refracted by the optical dome 220 and thus may be dispersed.

As mentioned above, the optical dome 220 may disperse light emitted from the light emitting diode 210 as well as protecting the light emitting diode 210 from external mechanical and/or chemical or electrical actions.

The light source device 100 may include light patterns 161 and 162 disposed on a portion of the substrate 112 corresponding to the through hole 120a of the reflective sheet 120. The light patterns 161 and 162 may include a first light pattern 161 and a second light pattern 162.

The first light pattern 161 may be provided on the substrate 112. The first light pattern 161 may be located inside the optical dome 220. A plurality of first light patterns 161 may be provided. FIG. 6 illustrates that four first light patterns 161 are provided, but the number of first light patterns 161 is not limited thereto.

The first light pattern 161 may be formed of a material having a higher reflectivity than the substrate 112. The first light pattern 161 may be formed of high reflectance silk. Because the first light pattern 161 is provided to reflect light emitted from the light emitting diode 210 or light reflected from the optical dome 220, the efficiency of the light source device 100 may be improved.

Alternatively, the first light pattern 161 may be provided to absorb light emitted from the light emitting diode 210 and convert the absorbed light into other color light, or the first light pattern 161 may be provided to only absorb light emitted from the light emitting diode 210. Because the first light pattern 161 is provided as described above, uniformity of light of the display apparatus 10 may be improved.

The second light pattern 162 may be provided on the substrate 112 exposed through the through hole 120a. The second light pattern 162 may be located outside the optical dome 220. The second light pattern 162 may be formed of a material different from the first light pattern 161. The second light pattern 162 may be formed by including copper.

The second light pattern 162 may include a second a (2a) light pattern 162a and a second b (2b) light pattern 162b. As shown in FIG. 6, the second a (2a) light pattern 162a and the second b (2b) light pattern 162b may have the same shape. Alternatively, referring to FIG. 10, a second a (2a) light pattern 162a' and a second b (2b) light pattern 162b' of the second light pattern 162' may have different shapes from each other. For example, as shown in FIG. 10, the second a (2a) light pattern 162a' may be provided in a circular shape, and the second b (2b) light pattern 162b' may be provided in a square shape. The shapes of the second a (2a) light pattern 162a' and the second b (2b) light pattern 162b' are not limited thereto, and may be provided in a triangular or polygonal shape.

The second light pattern 162 may be provided to absorb at least a portion of light emitted from the light emitting diode 210. Because the second light pattern 162 is provided to absorb a portion of light emitted from the light emitting diode 210 or a portion of light incident toward the substrate 112, uniformity of light of the display apparatus 10 may be improved.

Figure 11:
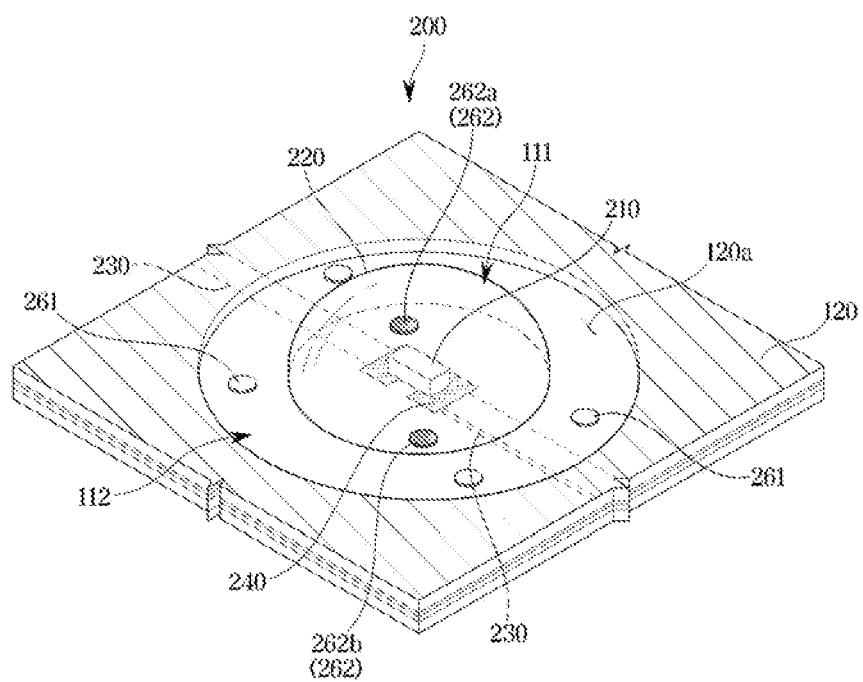
FIG. 11 is a perspective view of a light source included in a light source device according to still another embodiment of the disclosure.

FIG. 11 is a perspective view of a light source included in a light source device according to still another embodiment of the disclosure.

A light source device 200 according to still another embodiment will be described with reference to FIG. 11. However, for the same configuration as the embodiment illustrated in FIG. 6, the same reference numerals are assigned, and detailed descriptions may be omitted.

Referring to FIG. 11, the light source device 200 may include a first light pattern 261 and a second light pattern 262. Unlike the embodiment shown in FIG. 6, the first light pattern 261 may be provided on the substrate 112 exposed through the through hole 120a, but may be disposed outside the optical dome 220, and the second light pattern 262 may be disposed inside the optical dome 220.

The first light pattern 261 may be formed of a material having a higher reflectivity than the substrate 112. The first light pattern 261 may be formed of high reflectance silk. Because the first light pattern 261 reflects a portion of light emitted from the light emitting diode 210 or a portion of light incident on the substrate 112, the efficiency of the light source device 200 may be improved.

The second light pattern 262 may include a second a (2a) light pattern 262a and a second b (2b) light pattern 262b. The second a (2a) light pattern 262a may have the same shape as the second b (2b) light pattern 262b. Alternatively, the second a (2a) light pattern 262a may have a different shape from the second b (2b) light pattern 262b. Because the second light pattern 262 is provided to absorb a portion of light emitted from the light emitting diode 210 or a portion of light reflected from the optical dome 220, uniformity of light of the display apparatus 10 may be improved.

Figure 12:
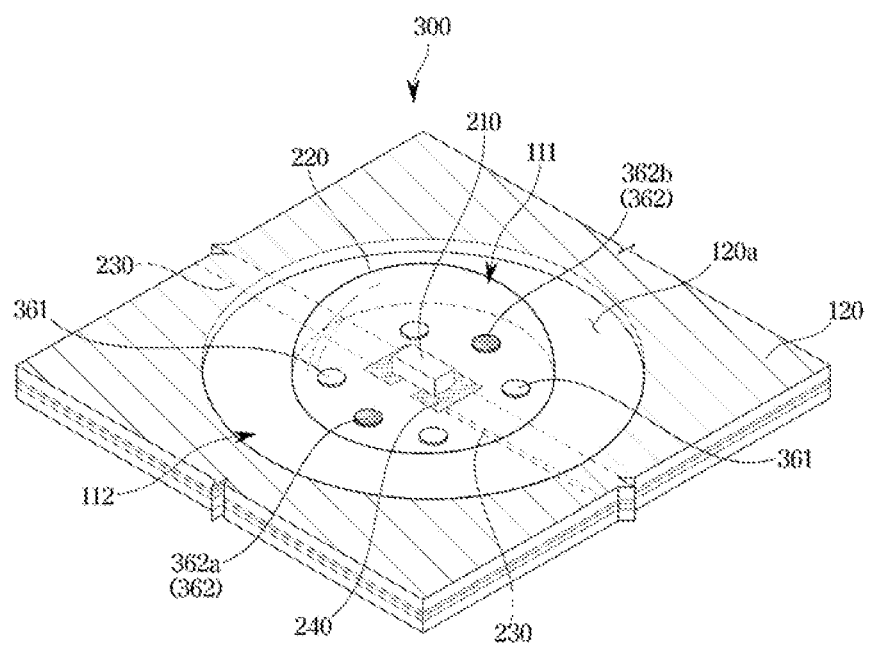
FIG. 12 is a perspective view of a light source included in a light source device according to still another embodiment of the disclosure.

FIG. 12 is a perspective view of a light source included in a light source device according to still another embodiment of the disclosure.

A light source device 300 according to still another embodiment will be described with reference to FIG. 12. However, for the same configuration as the embodiment illustrated in FIG. 6, the same reference numerals are assigned, and detailed descriptions may be omitted.

Referring to FIG. 12, the light source device 300 may include a first light pattern 361 and a second light pattern 362. The first light pattern 361 and the second light pattern 362 may be disposed inside the optical dome 220.

The first light pattern 361 may be formed of a material having a higher reflectivity than the substrate 112. The first light pattern 361 may be formed of high reflectance silk. Because the first light pattern 361 reflects a portion of light emitted from the light emitting diode 210 or a portion of light reflected from the optical dome 220, the efficiency of the light source device 300 may be improved.

The second light pattern 362 may include a second a (2a) light pattern 362a and a second b (2b) light pattern 362b. The second a (2a) light pattern 362a may have the same shape as the second b (2b) light pattern 362b. Alternatively, the second a (2a) light pattern 362a may have a different shape from the second b (2b) light pattern 362b. Because the second light pattern 362 is provided to absorb a portion of light emitted from the light emitting diode 210 or a portion of light reflected from the optical dome 220, uniformity of light of the display apparatus 10 may be improved.

Figure 13:
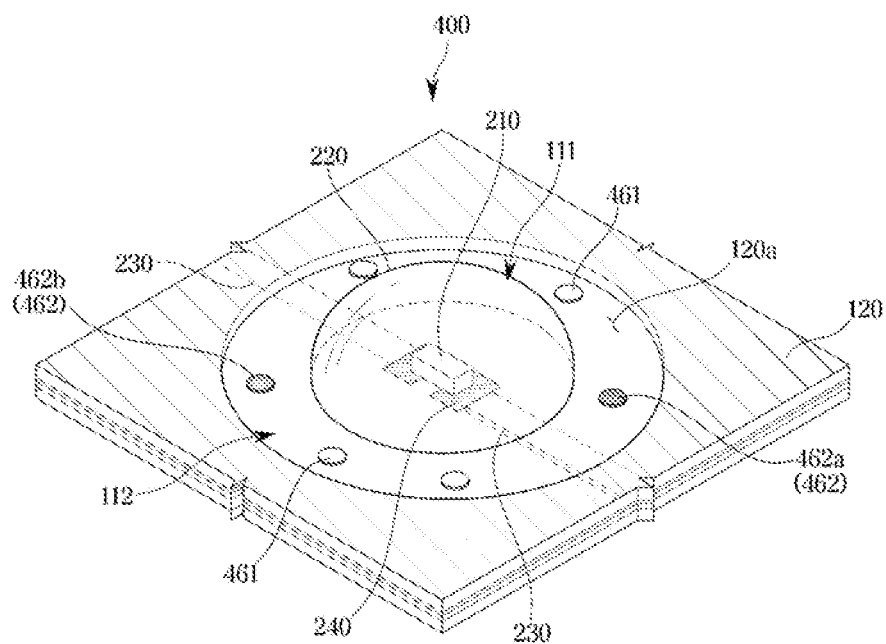
FIG. 13 is a perspective view of a light source included in a light source device according to still another embodiment of the disclosure.

FIG. 13 is a perspective view of a light source included in a light source device according to still another embodiment of the disclosure.

A light source device 400 according to still another embodiment will be described with reference to FIG. 13. However, for the same configuration as the embodiment illustrated in FIG. 6, the same reference numerals are assigned, and detailed descriptions may be omitted.

Referring to FIG. 13, the light source device 400 may include a first light pattern 461 and a second light pattern 462. The first light pattern 461 and the second light pattern 462 may be provided on the substrate 112 exposed through the through hole 120a, and may be disposed outside the optical dome 220.

The first light pattern 461 may be formed of a material having a higher reflectivity than the substrate 112. The first light pattern 461 may be formed of high reflectance silk. Because the first light pattern 461 reflects a portion of light emitted from the light emitting diode 210 or a portion of light incident on the substrate, the efficiency of the light source device 400 may be improved.

The second light pattern 462 may include a second a (2a) light pattern 462a and a second b (2b) light pattern 462b. The second a (2a) light pattern 462a may have the same shape as the second b (2b) light pattern 462b. Alternatively, the second a (2a) light pattern 462a may have a different shape from the second b (2b) light pattern 462b. Because the second light pattern 462 is provided to absorb a portion of light emitted from the light emitting diode 210 or a portion of light incident on the substrate, uniformity of light of the display apparatus 10 may be improved.

While the disclosure has been described with reference to embodiments, it may be understood by those of skilled in the art that various changes in form and details may be made without departing from the spirit and scope of the disclosure.

The invention claimed is:

1. A light source device comprising:
   a reflective sheet through which a through hole is disposed; and
   a light source module exposed through the through hole, and comprising:
     a substrate on which the reflective sheet is disposed;
     a light emitting diode disposed on a portion of the substrate, the portion corresponding to the through hole;
     an optical dome covering the light emitting diode;
     a first light pattern disposed on the substrate and inside the optical dome, the first light pattern comprising a material having a reflectivity higher than a reflectivity of the substrate; and
     a second light pattern disposed on another portion of the substrate and completely outside of the optical dome, the other portion of the substrate being exposed through the through hole.

2. The light source device of claim 1, wherein the first light pattern comprises silk.

3. The light source device of claim 1, wherein the second light pattern comprises copper.

4. The light source device of claim 1, wherein the second light pattern comprises a plurality of light patterns having a same shape.

5. The light source device of claim 1, wherein the second light pattern comprises a material different from the material of the first light pattern.

6. The light source device of claim 1, wherein the optical dome comprises silicon.

7. The light source device of claim 1, wherein the light emitting diode is configured to emit blue light.

8. A display apparatus comprising:
   a light source device configured to output surface light; and
   a liquid crystal panel configured to block and transmit the output surface light, wherein the light source device comprises:
     a reflective sheet through which a through hole is formed; and
     a light source module exposed through the through hole, and comprising:
       a substrate on which the reflective sheet is disposed;
       a light emitting diode disposed on a first portion of the substrate, the first portion corresponding to the through hole;
       an optical dome covering the light emitting diode and comprising silicon;
       a first light pattern disposed on a second portion of the substrate and completely inside the through hole, the second portion being exposed through the through hole; and
       a second light pattern provided on a third portion of the substrate, the second light pattern being disposed completely inside the through hole and outside of the optical dome, the third portion being exposed through the through hole, and the second light pattern comprising a material different from a material of the first light pattern.

9. The display apparatus of claim 8, wherein the first light pattern is disposed inside the optical dome.

10. The display apparatus of claim 8, wherein the first light pattern is disposed outside the optical dome.

11. The display apparatus of claim 10, wherein the first light pattern is configured to absorb blue light that is emitted from the light emitting diode, and convert the absorbed blue light to a different color light, and
    wherein the second light pattern is configured to absorb the emitted blue light.

12. The display apparatus of claim 10, wherein the first light pattern is configured to absorb blue light that is emitted from the light emitting diode, and
    wherein the second light pattern is configured to absorb the emitted blue light.

13. The display apparatus of claim 8, wherein the first light pattern is configured to reflect or absorb light emitted from the light emitting diode, and the second light pattern is configured to absorb light from the light emitting diode.

14. A light source device comprising:
    a substrate;
    a reflective sheet disposed on the substrate and through which a through hole is disposed;
    a light emitting diode disposed on a first portion of the substrate, the first portion corresponding to the through hole;
    an optical dome covering the light emitting diode;
    a first light pattern disposed on a second portion of the substrate and inside the optical dome, the second portion corresponding to the through hole, and the first light pattern comprising a material having a reflectivity higher than a reflectivity of the substrate; and
    a second light pattern disposed on a third portion of the substrate, the second light pattern being disposed completely inside the through hole and outside the optical dome, the third portion being exposed through the through hole and corresponding to the through hole.

15. The light source device of claim 14, wherein the second light pattern has a shape different from a shape of the first light pattern.

16. The light source device of claim 14, wherein the second light pattern comprises a plurality of light patterns, a first one among the plurality of light patterns having a shape different from a shape of the first light pattern, and a second one among the plurality of light patterns having a shape same as the shape of the first light pattern.

17. The light source device of claim 14, wherein the second light pattern comprises a material different from the material of the first light pattern.

18. The light source device of claim 14, wherein the second light pattern comprises a number of light patterns that is different from a number of light patterns of the first light pattern.

* * * * *